United States Patent [19]

Snidar

[11] 3,841,772
[45] Oct. 15, 1974

[54] JOINT CONSTRUCTION
[75] Inventor: Edward A. Snidar, Palm Harbor, Fla.
[73] Assignee: Gulf & Western Manufacturing Company, Southfield, Mich.
[22] Filed: May 25, 1973
[21] Appl. No.: 364,013

[52] U.S. Cl. .............................................. 403/224
[51] Int. Cl. ............................................. F16b 9/00
[58] Field of Search .......... 403/224, 225, 220, 203, 403/291, 57, 131, 69

[56] References Cited
UNITED STATES PATENTS

| | | | |
|---|---|---|---|
| 2,126,703 | 8/1938 | Schmidt | 403/203 |
| 2,283,440 | 5/1942 | Hufferd | 403/69 |
| 2,515,799 | 7/1950 | Rouy | 403/203 X |
| 2,702,087 | 2/1955 | Beiler | 403/225 X |
| 3,199,903 | 8/1965 | Wood | 403/224 |

Primary Examiner—Geo. V. Larkin
Attorney, Agent, or Firm—Barnes, Kisselle, Raisch & Choate

[57] ABSTRACT

A flexible joint to serve in the function of a ball joint composed of inner and outer joint members concentrically arranged around an axis with a circumferential space between the inner and outer members joined by web portions of flexible material which allows ball joint action between the parts while creating certain predetermined resistance as the action approaches its extremities.

7 Claims, 4 Drawing Figures

PATENTED OCT 15 1974　　　　　　　　　3,841,772

JOINT CONSTRUCTION

This invention relates to a molded joint construction and more particularly to a joint which will function in the same manner as a ball joint while being made of a unitary or integral construction.

It is an object of the present invention to provide an inexpensive, flexible joint which can be utilized in automotive suspension and steering mechanisms and which will require no lubrication.

It is a further object to provide a joint which is not subject to deterioration by weathering or by dirt since it will function essentially as a self-cleaning joint to cause dislodgement of any debris that might temporarily attach to it.

A resilient joint construction is shown in a patent to Hufferd U.S. Pat. No. 2,283,440, issued May 19, 1942; and the present invention is intended to be an improvement over this type of construction in that the structure to be disclosed is a unitary molded construction which has distinct advantages from the point of view of cost, assembly, and wear life.

Other objects and features of the invention will be apparent in the following description and claims in which the principles of operation and the details of construction are shown in connection with the best mode presently contemplated for the invention.

Figure 1:
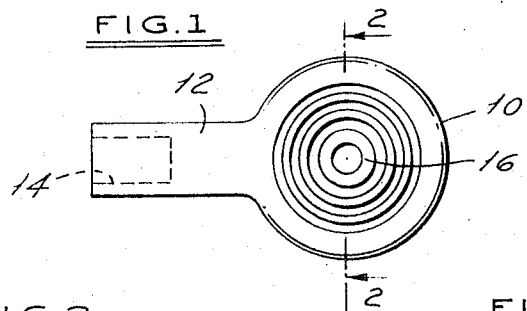

Drawings accompany the disclosure and the various views thereof may be briefly described as:

FIG. 1, a top view of a part constructed in accordance with the invention.

Figure 2:
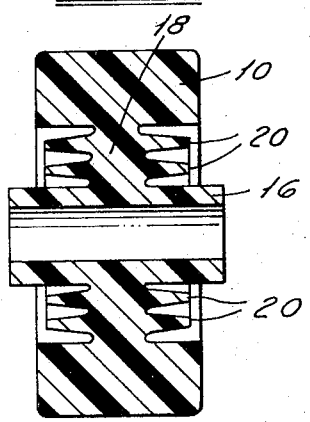

FIG. 2, a sectional view on line 2—2 of FIG. 1.

Figure 3:
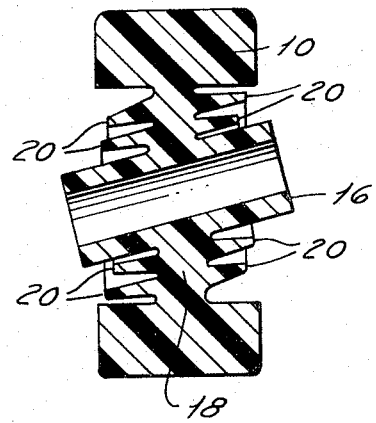

FIG. 3, a view of the joint in displaced position.

Figure 4:
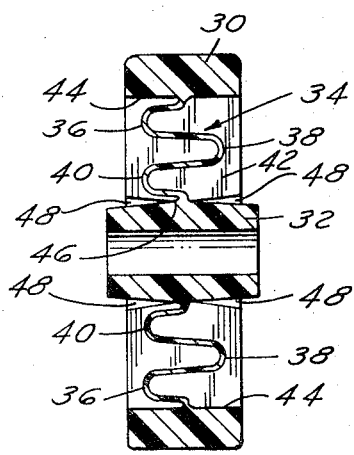

FIG. 4, a sectional view of a modified construction.

Figure 5:
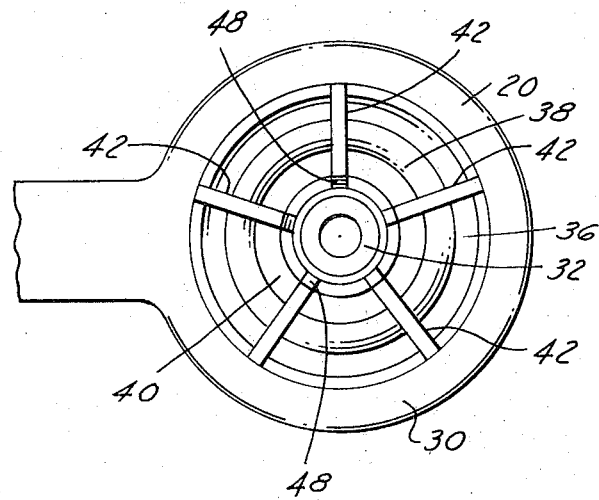

FIG. 5, a top view of the modified construction.

Referring to the drawings:

In FIG. 1, the joint consists of a main outer ring 10 having a fastening shank 12 which may be either provided with a threaded socket 14 or externally threaded for a desirable mount. Concentric with and inside the main outer ring is a smaller mounting sleeve 16 which has a slightly longer axial length than the main ring 10 and in which can be mounted the shaft of another part to be articulated to the main ring mount.

The parts are molded together in a manner which provides a continuous web portion 18 having considerably less axial thickness than either the outer ring or the sleeve 16. The axial thickness of this web will depend on the loads that are intended to be carried but it must have a dimension wherein it can be flexed to some degree as the joint is worked. Extending outwardly from this web 18 are concentric double flanges 20 which extend to either side of the web, these flanges having the function of strengthening the web but also serve to limit the pivotal movement of the sleeve 16 by reason of radial contact as the parts are worked. It will be noted that the flanges are tapered from the base portion joined to the web 18 to the outer ends. This facilitates molding but also allows the joint movement desired.

In FIG. 3, the displacement of the sleeve 16 shows the manner in which the radial spaced double flanges 20 will merge toward each other on the cramping side of the movement and ultimately cause a limitation of the motion. They also tend to increase the resistance to some degree as the parts are moved to the extreme positions and to reinforce the entire construction against damage. Otherwise, the parts are such that they allow free motion in any direction with equalized resistance between the outer ring and the inner sleeve in much the same manner as a ball joint.

In FIG. 4, a modified construction illustrates a unit having an outer ring 30 and an inner sleeve 32. The intervening resistance elements between these two parts are formed by an undulating relatively thin web 34 which, in cross-section, has three loops 36, 38 and 40, the web being integral with the outer ring and the inner ring at the inner and outer circumferences respectively and completely circumferential in the annular space between parts 30 and 32. This web is reinforced by radial ribs 42 which are secured on an axial line 44 to the inner wall of the outer ring 20. These ribs are secured to the inner sleeve 32 only at the center portion 46 adjacent the point where the web 34 merges with the inner sleeve. The ribs are tapered outwardly from this point to leave gaps 48. It will thus be seen that when the inner sleeve 32 is angled relative to the outer ring 30, the web 34 will stabilize the ribs 42 and provide a certain amount of resistance to the motion. The gaps 48 will allow relatively free motion in a limited angle and beyond this point the motion will be resisted by the compression of both the ribs 42 and the web 34.

The parts in both embodiments above described can be molded from a plastic having a suitable weather-resistant characteristic and life that is required for the particular joint. The flexiblity characteristics can also be adjusted to the particular load requirements which is called for by the application for the joint.

I claim:

1. A joint to serve in the capacity of a vehicle ball joint comprising; an annular outer supporting member, an inner supporting member received generally concentrically within said outer supporting member with a generally annular space therebetween, an annular web interconnecting said members and extending through the annular space therebetween, said web having flexible characteristics allowing cocking of said members relative to each other while providing resistance to said cocking in any direction, said annular web having an axial dimension relatively smaller than the axial dimension of said members, and annular flanges spaced radially from each other and extending axially from said annular web to provide an interference action which resists further cocking from a predetermined degree of generally axial cocking between said members.

2. A joint to serve in the capacity of a vehicle ball joint comprising; an annular outer supporting member, an inner supporting member received generally concentrically within said outer supporting member with a generally annular space therebetween, and an annular web interconnecting said members and extending through the annular space therebetween, said annular web having flexible characteristics allowing cocking of said members relative to each other and providing resistance to said cocking in any direction, said annular web having an undulating cross section throughout its generally radial extent.

3. A joint as defined in claim 2 wherein said outer supporting member, inner supporting member and annular web are a one-piece body of a homogeneously integral nonmetallic material.

4. A joint as defined in claim 2 which also comprises circumferentially spaced generally radially extending ribs received between said members, said ribs being integral with said annular web.

5. A joint as defined in claim 4 in which said ribs are jointed to one of said members by a first portion which is narrowed relative to the axial extent of said ribs, each of said ribs having a second portion adjacent said first portion and generally radially spaced from said one member and positioned for interference with said one member on a predetermined degree of generally axial cocking of said members relative to each other.

6. A joint as defined in claim 1 wherein said outer supporting member, inner supporting member and annular web are a one-piece body of a homogeneously integral nonmetallic material.

7. A joint functioning as a vehicle ball joint comprising: a one-piece body of a homogeneously integral nonmetallic plastic material having an annular outer supporting member, an inner supporting member concentric with said outer supporting member with an annular space therebetween and an annular web interconnecting said members through the annular space therebetween, said annular web being sufficiently flexible to permit substantial generally axial cocking of said members relative to each other while resiliently yieldably resisting said generally axial cocking of said members relative to each other in any direction thereof such that said joint functions as a vehicle ball joint.

* * * * *

PO-1050
(5/69)

UNITED STATES PATENT OFFICE
CERTIFICATE OF CORRECTION

Patent No. 3,841,772    Dated October 15, 1974

Inventor(s) Edward A. Snidar

It is certified that error appears in the above-identified patent and that said Letters Patent are hereby corrected as shown below:

Please correct the name of the assignee to read:

Gulf & Western Manufacturing Company (Michigan)

Signed and sealed this 14th day of January 1975.

(SEAL)
Attest:

McCOY M. GIBSON JR.
Attesting Officer

C. MARSHALL DANN
Commissioner of Patents